United States Patent [19]
Harrell

[11] Patent Number: 5,292,171
[45] Date of Patent: Mar. 8, 1994

[54] VEHICLE SEAT ARMREST BRACKET AND COVER ASSEMBLY

[75] Inventor: David J. Harrell, Royal Oak, Mich.

[73] Assignee: Lear Seating Corporation, Southfield, Mich.

[21] Appl. No.: 891,607

[22] Filed: Jun. 1, 1992

[51] Int. Cl.$^5$ .................................... A47C 17/04
[52] U.S. Cl. .................................... 297/113
[58] Field of Search .............. 297/113, 417, 411; 16/250, 251, 273

[56] References Cited

U.S. PATENT DOCUMENTS

| | | | |
|---|---|---|---|
| 3,768,117 | 10/1973 | Toldo et al. | 16/251 |
| 3,909,063 | 9/1975 | Bonisch et al. | 297/113 |
| 4,435,011 | 3/1984 | Hakamata | 297/113 |
| 4,759,583 | 7/1988 | Schrom et al. | 297/113 |
| 4,848,840 | 7/1989 | Toya | 297/417 |
| 4,958,877 | 9/1990 | Lezotte et al. | 16/25 |

Primary Examiner—Peter M. Cuomo
Assistant Examiner—Jerry Redman
Attorney, Agent, or Firm—Reising, Ethington, Barnard, Perry & Milton

[57] ABSTRACT

A vehicle seat armrest assembly includes an armrest (10) having a pair of opposing sides (24,26) and a metal armrest bracket (28) disposed adjacent each side (24,26) of the armrest (10) for pivotally supporting the armrest (10) and fixedly attaching the armrest (10) to a vehicle seat (12). A plastic shielding means or bracket cover member (46) is disposed between each side (24,26) of the armrest (10) and the adjacent bracket (28) for shielding the sides of the armrest (10) against direct contact with the metal bracket (28).

12 Claims, 2 Drawing Sheets

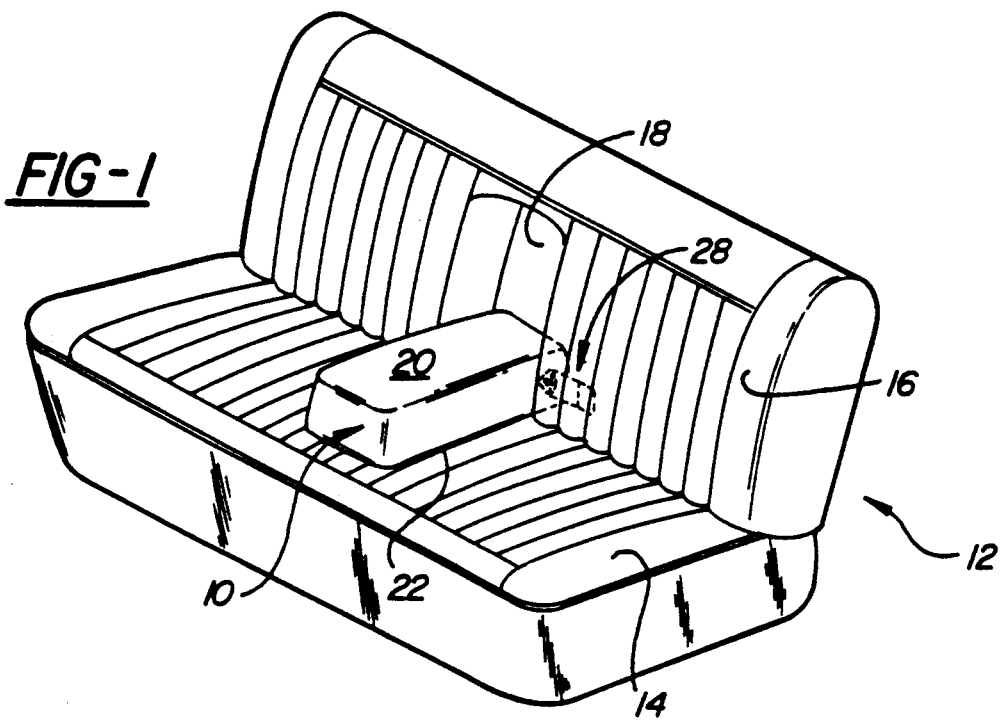
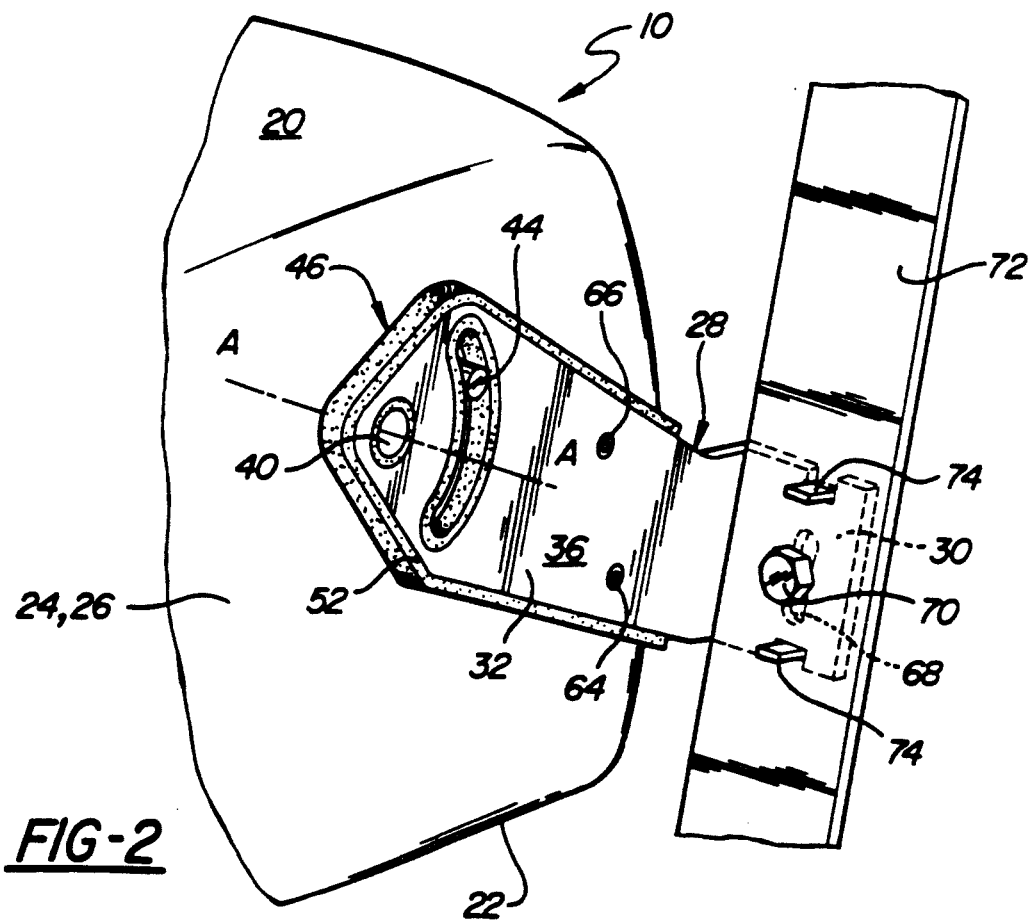

VEHICLE SEAT ARMREST BRACKET AND COVER ASSEMBLY

BACKGROUND OF THE INVENTION

Field of the Invention

The subject invention relates generally to a vehicle armrest assembly, and more specifically, to a vehicle armrest assembly having an armrest bracket to provide pivotal rotation of the armrest between a horizontal use position and a vertical non-use position.

Description of the Related Art

Frequently known in the art are vehicles having an armrest assembly mounted to a seat assembly to provide a comfortable forearm rest to the driver and/or passengers. The armrest assembly is often mounted by a bracket between adjacent front bucket seats of the vehicle or in the center portion of a bench-type seat. The bracket provides pivotal rotation of the armrest between a horizontal use position and a vertical non-use position.

The bracket assembly generally includes a supporting portion disposed on opposite sides of the armrest for pivotally supporting the armrest and further includes a mounting portion for fixedly attaching the bracket and armrest assembly to the seat assembly. The supporting portion of the bracket assembly includes an aperture for receiving a pivot pin extending between the bracket and the armrest and further includes an arcuate slot formed in the bracket and spaced apart from the pivot pin for receiving a follower pin projecting outwardly from the side of the armrest to guide the armrest upon rotation about the pivot pin between the horizontal use position and the vertical non-use position.

However, as can be appreciated, the direct contact between the pivot pin and aperture and further between the follower pin and arcuate slot of the bracket often causes rapid frictional wear on the bracket assembly and pins. Furthermore, the direct contact between the opposing sides of the armrest and the adjacent bracket assembly causes further frictional wear on the armrest and the upholstery material generally covering the armrest.

The prior art has attempted to reduce the frictional wear in the pivot aperture and arcuate slot of the bracket by providing a resilient polymeric washer or spacer disposed between the bracket and the sides of the armrest. For example, U.S. Pat. No. 4,882,807 to Fry et al., issued Nov. 28, 1989, discloses a vehicle armrest assembly including a mounting bracket assembly disposed on opposite sides of the armrest for providing pivotal movement of the armrest. The armrest bracket assembly includes a pivot aperture defining a pivot axis and an arcuate slot spaced from the pivot axis. A polymeric washer member including a pivot aperture and arcuate slot each in registry with the respective pivot aperture and slot of the armrest bracket is seated between the side of the armrest and the adjacent bracket assembly. A hub extending outwardly from the side of the armrest includes a pivot pin received in the pivot apertures of the bracket and washer member and further secures a follower pin extending through the arcuate slots of the bracket and washer member. However, the resilient washer member remains insufficient in covering a substantial portion of the bracket assembly to eliminate direct contact between the bracket and the armrest and thus prevent frictional wear on the opposing sides of the armrest.

SUMMARY OF THE INVENTION

Therefore, in accordance with the present invention, there is provided a vehicle seat armrest assembly comprising an armrest having a top, a bottom, and a pair of opposing sides. A bracket is disposed adjacent each of the sides of the armrest and includes a mounting portion for fixedly attaching the bracket to a vehicle seat and further includes an armrest supporting portion extending from the mounting portion and adjacent each side of the armrest for supporting the armrest. The armrest supporting portions each include an inner surface facing toward the armrest and an outer surface facing away from the armrest. Pivot means extend between each of the brackets and the adjacent side of the armrest for pivotally supporting the armrest for movement between a horizontal use position and a vertical non-use position. The assembly is characterized by including shielding means disposed between each of the sides of the armrests and the adjacent bracket for shielding the sides of the armrest against direct contact with the brackets.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of an armrest assembly disposed for use with a vehicle seat assembly;

FIG. 2 is an enlarged fragmentary perspective view of the subject invention of FIG. 1;

DETAILED DESCRIPTION OF THE PREFERRED EMBODIMENT

Figure 3:
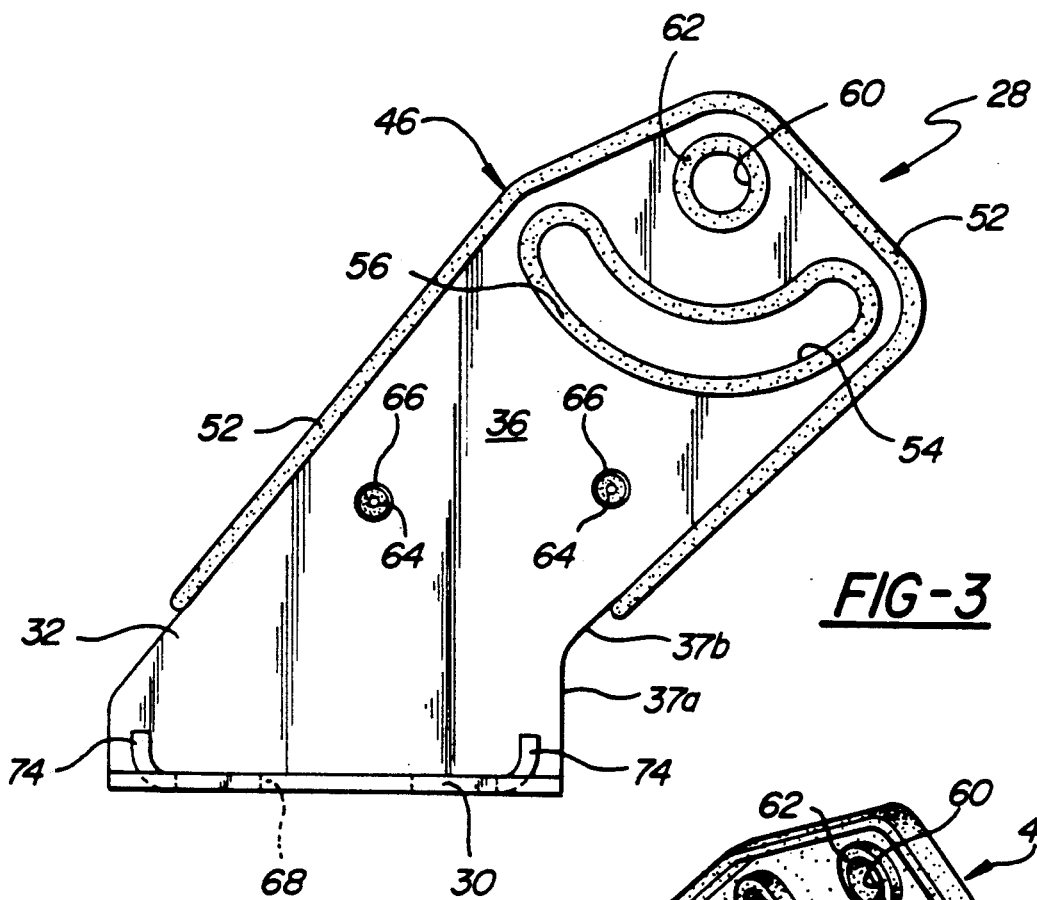
FIG. 3 is a side view of the bracket assembly and shielding means.
Figure 4:
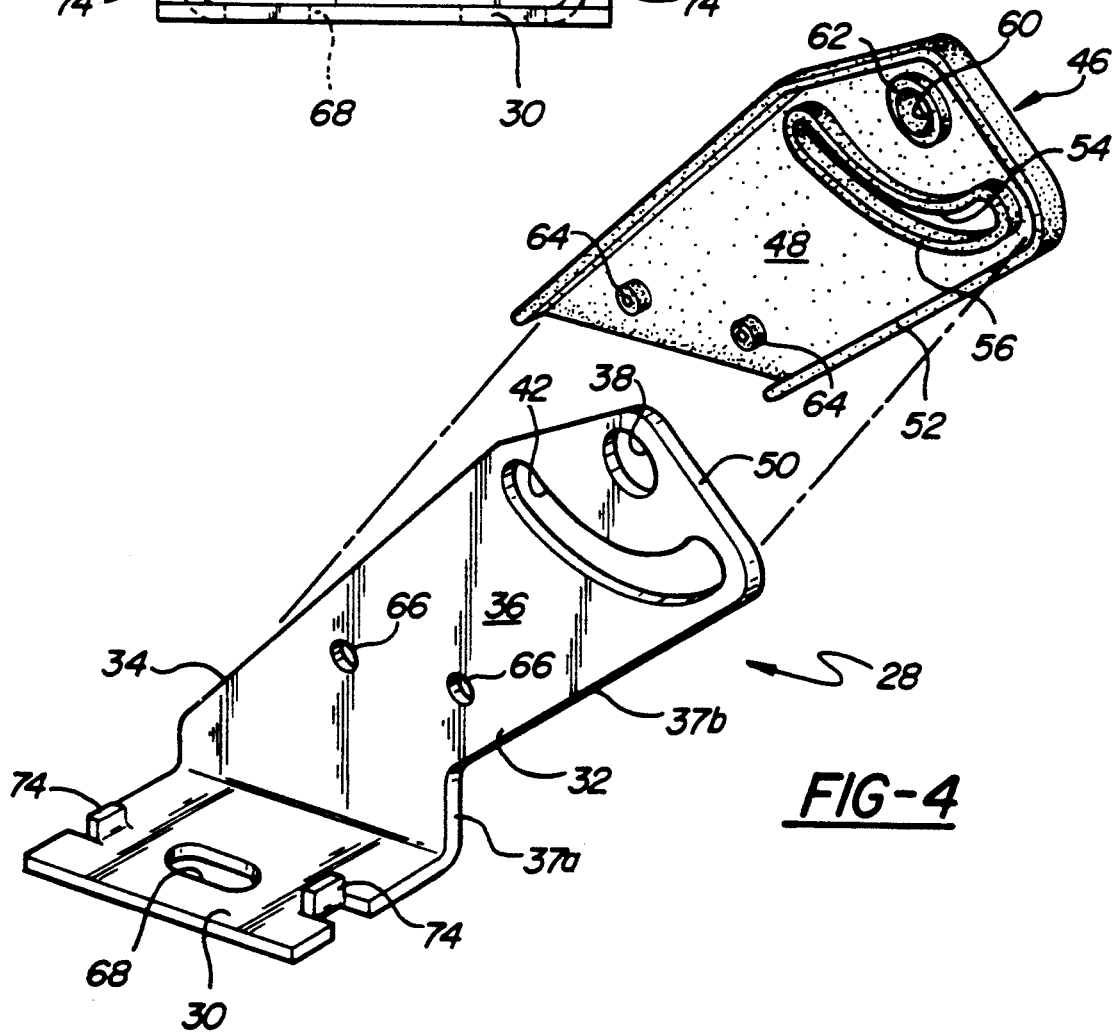
FIG. 4 is an exploded perspective view of the bracket assembly and shielding means.

Referring to the drawings wherein like numerals indicate like or corresponding parts throughout the several views, a vehicle seat armrest assembly is generally shown at 10 in FIG. 1. The armrest assembly 10 is generally mounted in association with a vehicle seat assembly as shown at 12. The seat assembly 12 may be of the type of parallel adjacent single bucket-type seats or an integral bench-type seat, both as are commonly known in the art. The assembly 12 includes a generally horizontal seat portion 14 and a generally vertical backrest portion 16. The seat armrest assembly 10 is commonly mounted between two backrest portions 16, or as shown in FIG. 1, in the center portion of a single integral bench-type backrest portion 16. Also as shown, the armrest assembly 10 is pivotal between a generally horizontal use position parallel with the seat portion 14 and a generally vertical non-use position parallel to the backrest portion 16. In the vertical non-use position, the armrest assembly 10 is commonly recessed in a cavity 18 disposed in the vertical backrest portion 16 such that the face of the armrest assembly 10 is aligned flush with the face surface of the backrest portion 16 to provide a comfortable backrest when not used as an armrest.

The seat armrest assembly 10 is generally a molded polymeric shell, such as any common plastic, covered with a foam padding and further wrapped in an upholstery material equivalent to the upholstery of the seat assemblies 12, i.e. vinyl, cloth or leather.

The armrest assembly 10 includes a top 20, a bottom 22, and a pair of opposing sides 24,26. The armrest 10 is mounted to the seat assembly 12 by a bracket 28 disposed adjacent each side 24,26 of the armrest 10. The bracket 28 is generally a thin metal plate of any common low grade stamped steel, i.e. 1008-1010 cold rolled steel, and includes a mounting portion 30 or plate extending perpendicular to the armrest sides 24,26 for fixedly attaching the bracket 28 to the seat assembly 12. The bracket 28 further includes an armrest supporting portion 32 extending upwardly and generally perpendicular to the mounting portion 30 to form a generally L-shaped armrest bracket 28. The supporting portions 32 of the bracket 28 are disposed adjacent and parallel each side 24,26 of the armrest 10 for supporting the armrest 10. The armrest supporting portions 32 include an inner surface 34 facing toward the armrest 10 and an outer surface 36 facing away from the armrest 10. The supporting portions include a first rather short portion 37a extending generally vertically upward from the mounting portion or plate and a second portion 37b extending from the first portion 37a at an upwardly inclined angle approximately 45 degrees from horizontal, as shown in FIG. 2. The supporting portion 32 of the bracket 28 includes a pivot aperture 38 therethrough for receiving a pivot pin 40, generally metal, extending outwardly from each side 24,26 of the armrest 10 between each of the brackets 28 for coupling the armrest 10 to the brackets 28 and providing pivotal movement of the armrest 10 between the horizontal use position and the vertical non-use position. The pivot pins 40 define a common pivot axis, indicated at A—A, about which the armrest 10 pivotally rotates.

An arcuate slot 42 is formed in each of the armrest supporting portions 32 of the brackets 28 and receives a follower pin 44, also generally metal, projecting outwardly from each side 24,26 of the armrest 10 for guiding the armrest 10 upon rotation about the pivot axis A—A between the horizontal use position and the vertical non-use position. The arcuate slot 42 has a direction of curvature extending partially around the pivot axis A—A as shown in FIG. 3.

The vehicle seat armrest assembly 10 is characterized by including a shielding means or cover member 46 disposed between each of the sides 24,26 of the armrest 10 and the adjacent bracket 28 for shielding the sides 24,26 of the armrest against direct contact with the metal brackets 28. The shielding means 46 is generally a resilient polymeric cover plate or cover member, such as a common acrylonitrile-butadiene-styrene (ABS) resin plastic, having a main body portion 48 substantially covering the inner surface 34 of the supporting portion 32 of the bracket 28. More specifically, the main body portion 48 of the cover 46 covers the second portion 37b of the bracket supporting portion 32. As shown in FIG. 2, the second portion 37b is the portion of the bracket 28 directly adjacent the armrest sides 24,26 and thus the main body portion 48 covers and shields the entire area of the metal bracket 28 which would otherwise contact the sides 24,26 of the armrest 10. As further shown in the Figures, the armrest supporting portion 32 has an outer peripheral edge 50 defined by the thickness in the sheet metal of the bracket 28. The shielding means or cover member 46 thus further includes an edge covering 52 extending outwardly from and generally perpendicular to the main body portion 48 and extending over and about the entire bracket edge 50 completely covering the edge 50 of the armrest supporting portion 32 of the bracket 28. Thus, the shielding means 46 substantially covers the inner surface 34 and peripheral edge 50 of the supporting portion 32 of each bracket 28 to prevent direct contact of the bracket 28 against each side 24,26 of the armrest 10 and thus prevent frictional resistance and wear to the upholstery material covering the armrest 10.

Still further, the shielding means or cover member 46 includes an arcuate slot 54 extending through the main body portion 48. The arcuate slot 54 is in registry with the arcuate slot 42 of the bracket 28. The arcuate slot 54 of the shield 46 includes an upstanding border 56 extending outwardly from and molded integrally with the main body portion 48 and about the entire periphery of the slot 54. The upstanding border 56 is received in the slot 42 of the adjacent bracket 28 and further disposed between the follower pin 44 and the arcuate slot 42 of the adjacent bracket 28. The width of the slot 54 of the cover 46 is substantially the same dimension as the diameter of the follower pin 44 received therein to further minimize the frictional resistance and wear therebetween. However, as can be appreciated, the width of the slot 54 may be smaller than the diameter of the pin 44 to provide a resistive force to the armrest upon pivotal rotation between the two positions. Also, the slot 54 may have a scalloped inner surface forming detents to receive the follower pin 44 in various positions and lock the armrest in any number of positions along the arcuate path between the horizontal and vertical positions.

In the preferred embodiment, the arcuate slot 54 of the shield 46 receives the follower pin 44 therein and prevents direct contact between the follower pin 44 and the slot 42 of the bracket 28 and thus diminishes the frictional wear between the follower pin 44 and the bracket 28. Furthermore, the follower pin 44 is guided along the arcuate slot 54 of the shield 46 as the armrest 10 pivotally rotates between the horizontal use position and the vertical non-use position. As the follower pin 44 reaches the opposite ends of the arcuate slot 54 it provides a stop or ending point at each respective position of the armrest 10.

The bracket 28 further includes an aperture 38 axially aligned with the pivot axis A—A for pivotally receiving the pivot pin 40 extending outwardly on each side 24,26 of the armrest 10 The shielding means or cover 46 includes an aperture 60 in registry with the aperture 38 of the bracket 28. The aperture 60 of the shielding means 46 includes an upstanding border 62 extending outwardly from and further molded integrally with the main body portion 48 and about the entire periphery of the aperture 60. The upstanding border 62 is received in the aperture 38 of the bracket 28 and further receives the pivot pin 40 extending from each side 24,26 of the armrest 10 and thus provides a bushing between the pivot pin 40 and the aperture 38 of the bracket 28. The upstanding border 62 further diminishes the frictional wear on the bracket 28 and armrest sides 24,26 by providing a polymeric bushing or barrier between the pivot pin 40 and the bracket 28. It will be appreciated, however, that the pivot aperture 38 and pin 40 assembly often includes a ratchet or torque mechanism to provide resistance to the armrest and thus a positive feedback to the user of the position of the armrest during rotation between the horizontal and vertical positions.

The shielding means 46 is fixedly secured to the bracket 28 by a plurality of fasteners 64 extending outwardly from the main body portion 48 and received in a plurality of respective holes 66 in the supporting portion 32 of the bracket 28. The fasteners 64 may be of any type commonly known in the art such as rivets, screws, bolts, or metal bendable tab portions.

Additionally, the mounting portion 30 of the brackets 28 includes an elongated slot 68 therein for receiving a fastener 70 to fixedly secure the bracket 28 to the seat assembly 12. The slot 68 allows adjustment or alignment of the bracket 28 along the seat 12. The fastener may be of any type commonly known in the arts such as a screw, bolt, or weld. The mounting portion 30 further includes a pair of alignment tabs 74 comprising portions of the stamped metal bracket 28 which are cut and bent upwardly on opposite sides of the mounting portion 30. The tabs 74 are received in a pair of spaced apart apertures 76 in the seat frame 72 for aligning the bracket 28 along the frame 72 for reception of the fastener 70 and further to prevent rotation of or linear sliding of the bracket 28 relative to the seat frame 70.

In operation, the bracket 28 is fixedly secured to the vehicle seat assembly 12 by fastening the mounting portion 30 via the slot 68 and fastener 70 to a portion of the seat 12, referring to FIG. 2 the mounting portion 30 is fastened to a frame member 72 of the seat backrest 16. The vehicle seat armrest assembly 10 is pivotally supported on the bracket 28 by the armrest supporting portion 32 of the bracket 28. The shielding means 46 is disposed between each side 24,26 of the armrest 10 and the adjacent bracket 28 for shielding the sides 24,26 against direct contact with the metal bracket 28. The upstanding border 62 of the shield aperture 60 is received in the aperture 38 of the bracket 28 and receives the pivot pin 40 to provide pivotal rotation of the armrest 10 between the horizontal use position and the vertical non-use position. Finally, the upstanding border 56 about the arcuate slot 54 in the shield 46 is similarly received in the arcuate slot 42 of the bracket 28 and the arcuate slot 54 receives the follower pin 44 therein to guide the armrest between the horizontal and vertical positions and to diminish the frictional wear between the follower pin 44 and the armrest bracket 28.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A vehicle seat armrest assembly comprising:
   an armrest (10) having a top (20), a bottom (22) and a pair of opposing sides (24,26);
   a bracket (28) disposed adjacent at least one of said sides (24,26) of said armrest (10), said bracket (28) including a mounting portion (30) for fixedly attaching said bracket (28) to a seat (12) and an armrest supporting portion (32) extending from said mounting portion (30) and adjacent said side (24,26) of said armrest (10), for supporting said armrest (10), said armrest supporting portion (32) having an inner surface (34) facing toward said armrest (10) and an outer surface (36) facing away from said armrest (10);
   pivot means (40) extending between said bracket (28) and said adjacent side (24,26) of said armrest (10) for defining a pivot axis (A—A) for pivotally supporting said armrest (10) for movement about said axis (A—A) between a horizontal use position and an upright non-use position; an arcuate slot (42) formed in said armrest supporting portion (32) of said bracket (28) and spaced from said pivot means (40), a follower pin (44) projecting outwardly from said side (24,26) of said armrest (10) and received in said arcuate slot (42) of said adjacent bracket (28) for guiding said armrest (10) upon rotation about said axis (A—A) between said use and non-use positions; and characterized by shielding means (46) disposed between said side (24,26) of said armrest (10) and said adjacent bracket (28) for shielding said side (24,26) of said armrest (10) against direct contact with said bracket (28), said shielding means including an arcuate slot (54) in registry with said arcuate slot (42) of said bracket (28), said arcuate slot (54) of said shielding means (46) having an upstanding border (56) extending outwardly about the periphery of said slot (54) and received in said bracket slot (42) for receiving said follower pin (44) therein, thus preventing direct contact between said pin (44) and said bracket (28), while guiding said armrest (10) between said horizontal use position and said upright non-use position.

2. An armrest assembly as set forth in claim 1 further characterized by said shielding means having a main body portion (48) substantially covering said inner surface (34) of said bracket (28).

3. An armrest assembly as set forth in claim 2 further characterized by said armrest supporting portion (32) having an outer peripheral edge (50) and said shielding means (46) having an edge cover (52) extending outwardly from said main body portion (48) and covering said edge (50) of said armrest supporting portion (32) of said bracket (28).

4. An armrest assembly as set forth in claim 3 further characterized by said pivot means (40) including a pivot pin (40) defining a common pivot axis (A—A) spaced apart from said arcuate slot (42).

5. An armrest assembly as set forth in claim 4 further characterized by said bracket (28) including an aperture (38) axially aligned with said pivot axis (A—A) for pivotally receiving said pivot pin (40) on each side of said armrest (10).

6. An armrest assembly as set forth in claim 3 further characterized by said shielding means (46) including an aperture (60) in registry with said aperture (38) of said adjacent bracket (28).

7. An armrest assembly as set forth in claim 6 further characterized by said aperture (60) of said shielding means (46) including an upstanding border (62) extending outwardly from said main body portion (48) about the periphery of said aperture (60) and received in said aperture (38) of said bracket (28) for further receiving said pivot pin (40) and providing a bushing between said pivot pin (40) and said bracket (28).

8. An armrest assembly as set forth in claim 7 further characterized by said shielding means (46) including a plurality of fasteners (64) extending outwardly from said main body portion (48) and received in a respective hole (66) in said bracket (28) to securely fasten said shielding means (46) to said bracket (28).

9. An armrest assembly as set forth in claim 8 further characterized by said mounting portion (30) of said bracket (28) including a slot (68) for receiving a fastener (70) to secure said bracket (28) to the seat (12).

10. An armrest assembly as set forth in claim 9 further characterized by said bracket (28) including a plurality of alignment tabs (74) extending outwardly from opposing sides of said mounting portion (30) for aligning said bracket on a mounting frame (72) of the seat (12).

11. An armrest assembly as set forth in claim 10 further characterized by including a metal bracket (28) disposed adjacent said opposing sides (24,26) and a polymeric cover member (46) substantially covering said inner surface (34) of said metal bracket (28).

12. A vehicle seat armrest assembly comprising:
   an armrest (10) having a top (20), a bottom (22) and a pair of opposing sides (24,26);
   a metal bracket (28) disposed adjacent each of said sides (24,26) of said armrest (10), each of said brackets (28) including a mounting portion (30) for fixedly attaching said metal bracket (28) to a seat (12) and an armrest supporting portion (30) extending from said mounting portion (30) and adjacent said side (24,26) of said armrest (10) for supporting said armrest (10), said armrest supporting portions (32) each having an inner surface (34) facing toward said armrest (10) and an outer surface (36) facing away from said armrest (10);
   an arcuate slot (42) formed in each of said armrest supporting portions (32) of said metal brackets (28);
   a pivot pin (40) extending between each of said metal brackets (28) and said adjacent side (24,26) of said armrest (10) for coupling said armrest (10) to said brackets (28) and providing pivotal movement of said armrest (10) between a horizontal use position and a vertical non-use position; said pivot pins (40) spaced apart from said arcuate slot (42);
   a follower pin (44) projecting outwardly from each side (24,26) of said armrest (10) and received in said arcuate slot (42) of said adjacent bracket (28) for guiding said armrest (10) upon rotation about said pivot axis (A—A) between said horizontal use position and said vertical non-use position;
   and characterized by a polymeric cover member (46) disposed between each of said sides (24,26) of said armrest (10) and said adjacent metal bracket (28) for shielding said sides (24,26) of said armrest (10) against direct contact with said metal brackets (28); said cover member (46) having a main body portion (48) substantially covering said inner surface (34) of said bracket (28) and having an arcuate slot (54) in registry with said slots (42) of said brackets (28), said slots (54) of said cover member (46) each including an upstanding border (56) extending outwardly from said main body portion (48) about the periphery of said slot (54) and received in said slots (42) of said adjacent bracket (28) and further disposed between each of said follower pins (44) and said adjacent bracket (28) for receiving said follower pin (44) therein to prevent direct contact between said follower pin (44) and said metal bracket (28) and for guiding said armrest (10) between said horizontal use position and said vertical non-use position.

* * * * *